United States Patent [19]

Bolleman et al.

[11] Patent Number: 5,395,592
[45] Date of Patent: Mar. 7, 1995

[54] ACOUSTIC LIQUID PROCESSING DEVICE

[76] Inventors: Brent Bolleman, 4021 West 30th Avenue, Vancouver, British Columbia, Canada, V6S 1X4; A. Bruce Dunwoody, 9571 Pickering Drive, Richmond, British Columbia, Canada, V7E 5A3

[21] Appl. No.: 131,416

[22] Filed: Oct. 4, 1993

[51] Int. Cl.⁶ .................. B06B 1/00; B01D 17/06; C02F 1/68; H02N 1/00
[52] U.S. Cl. .................... 422/128; 366/127; 210/748; 210/763; 310/309
[58] Field of Search ............... 422/128, 129; 366/127; 210/748, 763; 204/155, 157.15, 157.42; 310/309

[56] References Cited

U.S. PATENT DOCUMENTS

| | | |
|---|---|---|
| 2,578,505 | 12/1951 | Carlin . |
| 3,056,589 | 10/1962 | Daniel . |
| 3,118,979 | 1/1964 | Sessler et al. . |
| 3,464,672 | 9/1969 | Massa . |
| 3,544,733 | 12/1970 | Reylek et al. . |
| 3,753,886 | 8/1973 | Myers ........................ 210/748 |
| 3,946,829 | 3/1976 | Mori et al. . |
| 4,071,225 | 1/1978 | Holl . |
| 4,339,247 | 7/1982 | Faulkner et al. ................. 55/15 |
| 4,369,100 | 1/1983 | Sawyer . |
| 4,433,916 | 2/1984 | Hall . |
| 4,620,917 | 11/1986 | Nozawa et al. ................ 210/748 |
| 4,654,546 | 3/1987 | Kirjavainen . |
| 4,673,512 | 6/1987 | Schram . |
| 4,747,920 | 5/1988 | Muralidhara et al. .......... 204/182.3 |
| 4,885,783 | 12/1989 | Whitehead et al. . |
| 4,914,256 | 4/1990 | Rodewald . |
| 4,983,189 | 1/1991 | Peterson et al. . |
| 5,087,379 | 2/1992 | Morton et al. . |
| 5,130,031 | 7/1992 | Johnston . |
| 5,144,146 | 9/1992 | Wekhof ...................... 250/492.1 |
| 5,164,094 | 11/1992 | Stuckart . |
| 5,192,450 | 3/1993 | Heyman . |

FOREIGN PATENT DOCUMENTS

| | | |
|---|---|---|
| 449008 | 10/1991 | European Pat. Off. . |
| 3-151084 | 6/1991 | Japan . |
| WO90/00094 | 1/1990 | WIPO . |

OTHER PUBLICATIONS

"Audio and Ultrasonic Transducers Based on Electro-thermomechanical Film (ETMF)", Backman et al, Proc. IEEE Intl. Conf. on Acoustics, Speech and Signal Processing, vol. 2, pp. 1173–1176, 1990.

"Sonochemistry: from research laboratories to industrial plants", Berlan et al, Ultrasonics 1992, vol. 30, No. 4, pp. 205–211.

Primary Examiner—Robert J. Warden
Assistant Examiner—Christopher Y. Kim
Attorney, Agent, or Firm—Oyen Wiggs Green & Mutala

[57] ABSTRACT

An acoustic liquid processing device in the form of a vessel having an interior wall which surround a process liquid. An electrostatic film transducer is attached to the interior wall to substantially envelop a selected volume of the process liquid. The transducer's acoustic impedance is approximately equal to that of the process liquid. The transducer is energized to subject the process liquid to acoustic vibration.

13 Claims, 6 Drawing Sheets

ACOUSTIC LIQUID PROCESSING DEVICE

FIELD OF THE INVENTION

This invention pertains to an electrostatic film transducer for introducing acoustic vibrations into a process liquid.

BACKGROUND OF THE INVENTION

Acoustic liquid processing involves the use of acoustic vibrational energy to treat a process liquid. Typical treatments include chemical reaction stimulation, sterilization, flotation enhancement, degassing, defoaming, homogenization, emulsification, dissolution, deaggregation of powder, biological cell disruption, extraction, crystallization, agglomeration and separation.

Typically, such treatments employ acoustic vibrational energy frequencies in the ultrasonic range (i.e. above the human hearing threshold of about 16 kHz). Accordingly, acoustic fluid processing is sometimes called "ultrasonic processing" or "power ultrasound". More recently, the term "sonochemistry" has been applied to liquid processing techniques which use acoustic vibrations of any frequency. This invention pertains to the use of acoustic vibrations of any frequency, but is particularly useful at frequencies above 10 kHz.

A large body of literature has been written on the use of acoustic liquid processing for various applications. See for example "Sonochemistry: Theory, Applications and Uses of Ultrasound in Chemistry", by T. J. Mason and J. P. Lorimer, Ellis Horwood Limited, 1988; and "Practical Sonochemistry", by T. J. Mason, Ellis Horwood Limited, 1991.

In many processing applications, it is desirable to create a phenomenon known as "cavitation" wherein the process liquid is subjected to intense acoustic energy. This creates small, rapidly collapsing voids in the liquid. Although the inventors do not wish to be bound by any specific theories, it is generally believed that extreme local temperatures (i.e. 5000° K.) and pressures (i.e. 500 atm.) in the vicinity of the cavitational collapses are largely responsible for the processing action. Since the acoustic intensity necessary to produce cavitation becomes very large for acoustic frequencies above 100 kHz in most liquids, this type of processing is typically confined to frequencies below 100 kHz.

In some other processing applications, it is desirable to use forces associated directly with the acoustic field, such as acoustic radiation and agitation, to effect the processing action. Detailed aspects of these techniques and others are taught in literature such as U.S. Pat. Nos. 5,164,094 Stuckart; 4,673,512 Schram; 4,983,189 Peterson et al.; and 5,192,450 Heyman.

Prior art devices used in acoustic liquid processing have typically employed a flow-through duct arrangement to confine the process liquid within a selected treatment volume. A cylindrical flow-through duct arrangement is desirable in many applications, particularly those involving treatments requiring high acoustic intensities, because the acoustic energy is geometrically focused along the longitudinal axis of the cylinder. This has several advantages, including the ability to attain higher intensity acoustic vibrations within the focal region; confinement of intense cavitation away from equipment surfaces, thereby reducing surface erosion and transducer decoupling problems; and, facilitation of the use of catalysts, fixed solid reagents, or sources of electromagnetic radiation (i.e. ultraviolet light) within the focal region for maximum utilization of the cavitational energy.

Prior art acoustic liquid processing devices incorporating a cylindrical duct design for confining the process liquid within a selected volume include U.S. Pat. Nos. 2,578,505 Carlin; 3,056,589 Daniel; 3,021,120 Van der Burgt; 3,464,672 Massa; 4,369,100 Sawyer; 4,433,916 Hall; 4,352,570 Firth; and 3,946,829 Mori et al. European Patent specification 0 449 008 Desborough; and japanese patent 3-151084 Murata also disclose such devices.

Almost all prior art acoustic liquid processing devices have utilized piezoelectric or magnetostrictive transducers to generate acoustic vibrations for application to the process liquid. Although such transducer materials can very efficiently convert electrical energy to mechanical energy at fixed frequencies, they exhibit some disadvantages when used in acoustic liquid processing devices like those described above.

Consider for example liquid processing devices having cylindrical piezoelectric transducer configurations as disclosed in U.S. Pat. Nos. 3,464,672 Massa; or 3,056,589 Daniel; or, in Japanese Patent No. 3-151084 Murata. The rigid, fragile nature of most piezoelectric materials makes it difficult to manufacture large diameter transducers, which may restrict the volumetric capacity of the liquid processing device and/or the maximum acoustic intensity attainable along its longitudinal axis. Also, such transducers often require elaborate installation and mounting arrangements which add substantially to the cost of constructing and maintaining the liquid processing device. Also, large tensile stresses induced in the transducer may lead to mechanical fatigue.

Instead of attempting to fabricate a single cylindrical transducer structure, one may alternatively mount a plurality of small piezoelectric or magnetostrictive transducers at discrete locations spaced around the outside of the cylinder which contains the process liquid. U.S. Pat. Nos. 2,578,505 Carlin; 4,369,100 Sawyer; and, 4,433,916 Hall; and, European Patent Application No. 0 449 008 Desborough disclose such arrangements. This approach reduces problems with the transducer per se, compared to designs which use unitary cylindrical piezoelectric transducer elements. But, because it is difficult to couple a plurality of discrete transducers well with the resonant modes of the acoustic load (i.e. the process liquid), operating efficiency is typically reduced in such arrangements.

Furthermore, prior art liquid processing devices utilizing piezoelectric or magnetostrictive transducers require the transducer to operate at mechanical resonance, which precludes the generation of multiple or tunable frequencies by a single transducer, as may be desirable in some liquid processing applications.

SUMMARY OF THE INVENTION

The present invention is not subject to the deficiencies of prior art acoustic liquid processing devices because it employs a transducer with properties inherently different from those found in piezoelectric or magnetostrictive transducers. The transducers used in conjunction with the present invention are of the electrostatic film variety. These transducers address each of the problems associated with the prior art in the following ways:

(a) Unlike the fragile cylindrical piezoelectric materials used in U.S. Pat. Nos. 3,464,672 Massa; or 3,056,589 Daniel; or Japanese Patent No. 3-151084 Murata, electrostatic films are relatively flexible and robust so that they may be easily conformed into developable surfaces such as cylinders. This improves manufacturability and maintainability in general, particularly for large diameter devices. Further, the flexible nature of electrostatic films allows them to support comparatively large amplitudes of oscillation without inducing high stresses which would otherwise lead to mechanical fatigue.

(b) Since electrostatic film transducers have relatively small stiffness and mass impedances compared to the acoustic load, they need not be confined to operating at a frequency coinciding with their own mechanical resonance. This allows the transducer to be operated effectively in a multiple or tunable frequency mode.

In accordance with the preferred embodiment, the invention provides an acoustic liquid processing device in the form of a vessel having an interior wall for surrounding a process liquid. An electrostatic film transducer is attached to the interior wall to substantially envelop a selected volume of the process liquid. The transducer's acoustic impedance is approximately equal to that of the process liquid. The transducer is energized to subject the process liquid to acoustic vibration.

The vessel is preferably cylindrical. In one embodiment, the vessel comprises a single cylinder which directly contains the process liquid; the transducer being attached to the cylinder's interior wall. In another embodiment, the vessel comprises dual, concentric inner and outer cylinders separated by an annular region containing a coupling liquid; the transducer in this case being attached to the inner cylinder's outer surface, which in turn confines the process liquid. The inner cylinder's acoustic impedance approximately equals that of the process liquid.

The transducer may advantageously be fabricated as a multi-layer structure, as described in U.S. Pat. No. 4,885,783 Whitehead et al.

An acoustically transparent duct may be positioned within the vessel's interior wall to confine the process liquid to a selected volume; in which case a coupling liquid is provided between the duct and the interior wall. When applied to the single cylinder embodiment mentioned above, the duct confines the process liquid within the cylinder. When applied to the dual cylinder embodiment, the duct confines the process liquid within the inner cylinder.

In those embodiments which utilize a coupling liquid, the coupling liquid's cavitation threshold preferably exceeds that of the process liquid.

The acoustic vibrations generated by the transducer are preferably of an intensity sufficient to produce cavitation within the process liquid at points removed from the vessel's interior wall. The acoustic vibration may in some cases advantageously be characterized by a standing wave.

An ultraviolet light source, solid catalyst, and/or reagent may be axially aligned within the interior wall to enhance the liquid treatment process.

DETAILED DESCRIPTION OF THE PREFERRED EMBODIMENT

Figure 1:
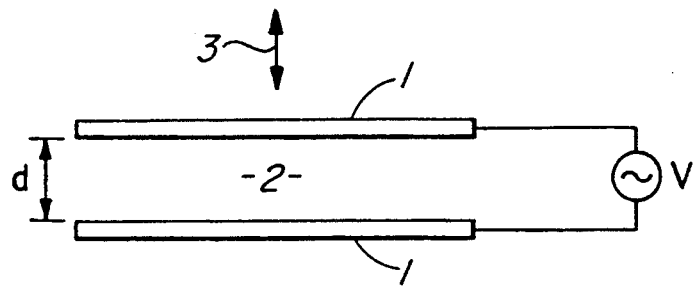
FIG. 1 is a simplified cross-sectional illustration of a prior art transducer.

FIG. 1 depicts the basic structure of a typical prior art transducer: opposed electrically conducting plates 1 separated by dielectric 2 which has a thickness "d" and dielectric constant "$\epsilon$". The electrostatic pressure "P" generated by applying a voltage difference "V" across plates 1 causes acoustic vibrations 3. The physical quantities of interest are given by the equation $P=(\epsilon V^2)/(2d^2)$. Accordingly, if voltage V is a sinusoid of frequency "f" then the electrostatic pressure P is a sinusoid of frequency $2f$.

Selection of an electrostatic film transducer for use in the present invention requires consideration of two key design criteria. First, in order for the electrostatic pressure P to generate substantial acoustic vibration 3, the impedances of the transducer must be well matched to that of the acoustic load (in this case the process liquid). Second, unlike conventional electrostatic transducers which are typically used for radiating low acoustic pressure levels, electrostatic film transducers suitable for practicing the present invention must be capable of generating very high electrostatic pressures. This necessitates the use of large electrostatic fields, typically at least ten million volts/meter. When subjected to such fields, any gases present in the dielectric will be prone to breakdown, unless the transducer is operating significantly to the left of the Paschen minimum product Pressure x Distance (Pd) curve for the gas in question (see for example FIG. 8 of U.S. Pat. No. 4,885,783 and the description pertaining thereto).

Figure 2:
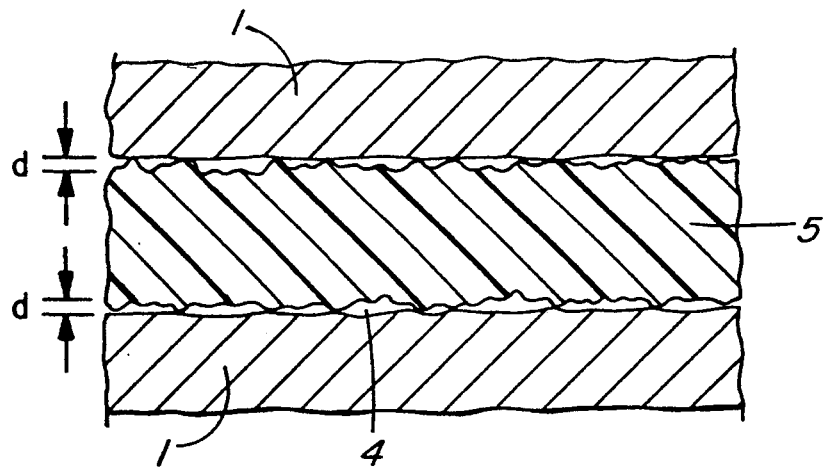
FIGS. 2, 3 and 4 are simplified cross-sectional views of various prior art electrostatic film transducers.
Figure 3:
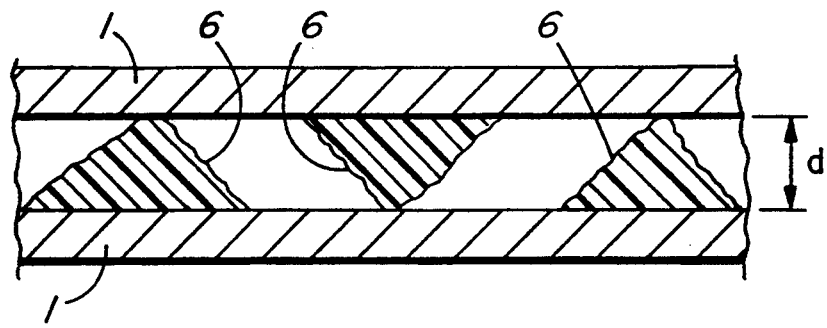

FIGS. 2 and 3 illustrate prior art techniques (both exemplified by U.S. Pat. No. 4,885,783 Whitehead et al) for satisfying the above design criteria. In FIG. 2, conducting plates 1 are separated by a closed cell foam dielectric in which biaxially oriented gas bubbles 4 are suspended in a compliant structure 5. In FIG. 3, conducting plates 1 are separated by regularly spaced compliant strips or nodules 6.

More particularly, the FIG. 2 transducer utilizes opposed plates 1 which are electrically coupled to an "energizing means" (i.e. electrical potential "V" applied across the plates). A compliant dielectric material 5 is disposed between the plates and in contact therewith. The dielectric material has a plurality of pockets 4 of approximate average depth "d" such that, for a gas existing within the pockets at a pressure "P", the product Pd is significantly less than the value required to achieve the minimum breakdown voltage of said gas. In the case of the FIG. 3 transducer, opposed first and second plates 1 are again electrically coupled to an energizing means which applies an electrical potential "V" across the plates. A compliant dielectric material 6 disposed between the plates and in contact therewith separates the plates by a distance "d", thus allowing a gas to exist between the plates at a pressure "P", such that the product Pd is significantly less than the value required to achieve the minimum breakdown voltage of the gas.

Figure 4:
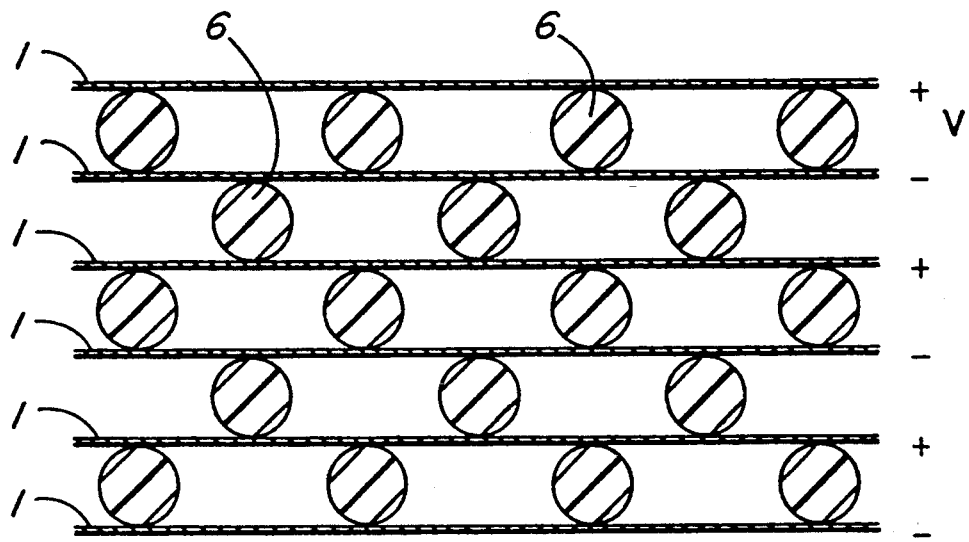

Manufacturing difficulties may establish a practical lower bound for the dielectric stiffness which can be attained. In such cases, the effective stiffness of the overall transducer structure may be reduced by utilizing multiple layers of electrostatic film to form the transducer structure. This technique reduces the stiffness of the overall transducer structure in direct proportion to the number of layers used. Such a multiple layer transducer structure is shown in FIG. 4. Here, 5 dielectric layers composed of compliant strips 6 alternately separate the 6 conductive plates 1. The stiffness of the FIG. 4 structure is theoretically one-fifth that of the equivalent single layer structure shown in FIG. 3.

Figure 5:
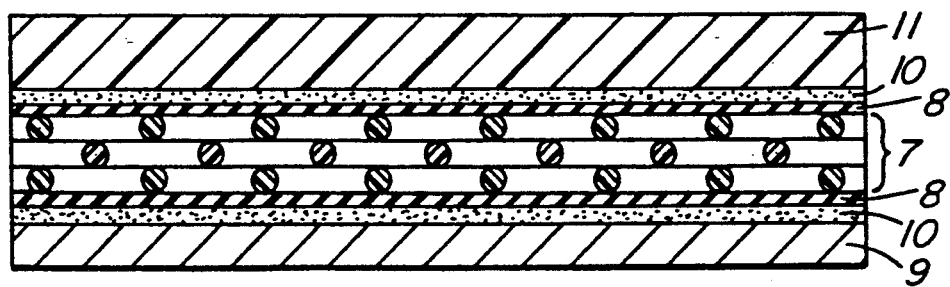
FIG. 5 is a cross-sectional view of an electrostatic transducer structure suitably mounted for use in accordance with the invention.

FIG. 5 illustrates a simple example of one possible means for mounting and protecting an electrostatic film transducer. Three-layer transducer structure 7, sealed and electrically insulated by layers 8, is fixed on one side to surface 9 by means of an adhesive bonding layer 10. A protective outer coating layer 11 is bonded by another adhesive layer 10 to the opposite side of transducer 7. Protective coating layer 11 is designed to resist corrosive and/or erosive effects of the process liquid.

Figure 6:
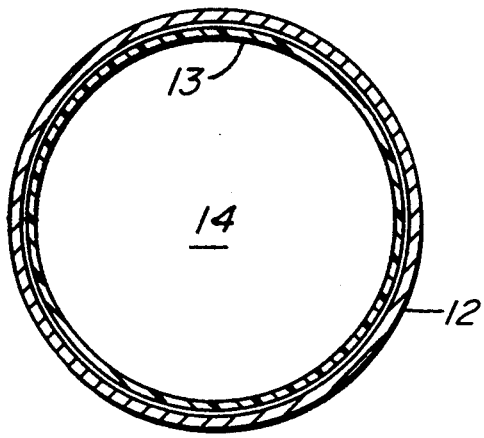
FIG. 6 is a cross-sectional view of a cylindrical embodiment of the invention in which the transducer is attached to the interior surface of the cylindrical process vessel's outer wall.

FIG. 6 depicts a cylindrical embodiment of the invention in cross-section. Cylindrical process vessel housing 12 provides structural support for transducer 13 and encloses process liquid 14. The design of housing 12 depends primarily on structural consideration of stresses imposed by the process liquid pressure, vibration fatigue, mass loading, etc. A typical construction material for housing 12 is carbon steel. Transducer 13, which may be similar in construction to the example shown in FIG. 5, is bonded to the interior wall of cylindrical housing 12 (i.e. the interior wall of the cylindrical housing is analogous to surface 9 in FIG. 5).

Figure 7:
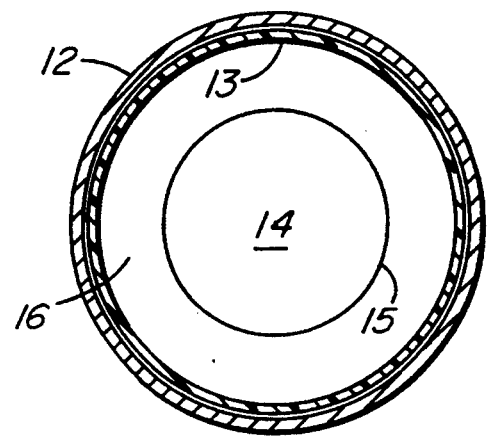
FIG. 7 is similar to FIG. 6, with the addition of an interior duct for carrying the process liquid.

FIG. 7 depicts the same structure as FIG. 6, with the addition of an interior duct 15 for enclosing process liquid 14. Duct 15 is designed to be approximately acoustically transparent so that it dissipates or reflects a minimal amount of the acoustic energy generated by transducer 13. This can be achieved by forming duct 15 of materials having mechanical impedance similar to that of the process liquid. Where possible, it is desirable to place duct 15 near a pressure antinode of the resonant system, as this will further minimize losses. The annular region between the outer surface of duct 15 and transducer 13 is filled with a coupling liquid 16 which transmits the acoustic vibrations from transducer 13 to duct 15 and thence to process liquid 14. Coupling liquid 16 preferably has a high cavitation threshold (such as olive oil) to prevent unwanted cavitation therein. Coupling liquid 16 may be caused to circulate within the annular region between the outer surface of duct 15 and transducer 13 to act as a coolant for transducer 13 and/or process liquid 14.

It is desirable to insert duct 15 between transducer 13 and process liquid 14 as shown in FIG. 7 whenever process liquid 14 is deemed incompatible with transducer 13 due to potential corrosion, erosion, heat, etc. factors which cannot effectively be controlled by the transducer's protective coating layer 11 alone. Duct 15 can also be used to confine process liquid 14 to a select region aligned with the cylindrical process vessel's longitudinal axis within which the intensity of the acoustic vibrations is greatest, thereby optimizing the use of the acoustic energy generated by transducer 13.

Figure 8:
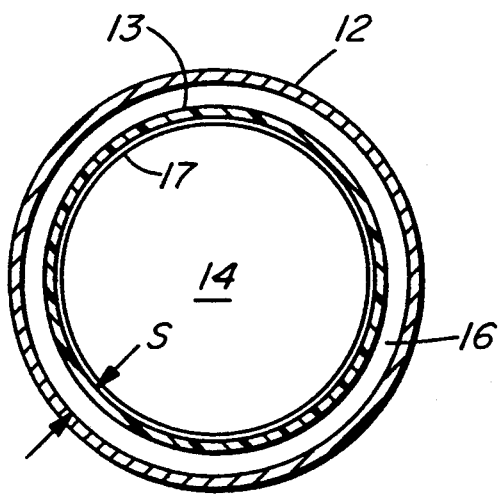
FIG. 8 is a cross-sectional view of another cylindrical embodiment of the invention in which the transducer is positioned away from the cylindrical process vessel's outer wall.

FIG. 8 depicts another cylindrical process vessel in which transducer 13 is held a fixed distance "s" away from the internal wall of structural housing 12. This is achieved by mounting transducer 13 on an acoustically transparent cylindrical support 17 mounted concentrically within housing 12 to define a gap of distance "s" between the respective inner and outer walls of housing 12 and support 17. Transducer 13 is preferably mounted on the outer wall of support 17 to isolate it from process liquid 14 (i.e. in this embodiment the process vessel's transducer-bearing "interior wall" is the outer wall of support 17). Coupling liquid 16 fills the annular region between housing 12 and transducer 13 and may again serve as a coolant for transducer 13 and/or process liquid 14.

The FIG. 8 embodiment allows design freedom in positioning of transducer 13 relative to the acoustic system. Specifically, transducer 13 can be placed somewhere other than on the inner surface of structural housing 12, to more optimally drive the acoustic system.

Figure 9:
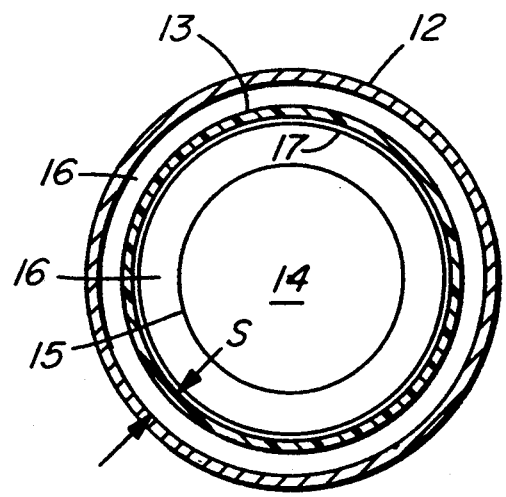
FIG. 9 is similar to FIG. 8, with the addition of an interior duct for carrying the process liquid.

FIG. 9 shows the addition of duct 15 to the Fibre 8 embodiment. As described above with reference to FIG. 7, duct 15 can be used to isolate transducer 13 from process liquid 14 and/or confine process liquid 14 to a select region aligned with the cylindrical process vessel's longitudinal axis to optimize the use of the acoustic energy generated by transducer 13. The annular regions between (i) the outer surface of duct 15 and the inner surface of support 17; and, (ii) transducer 13 and the inner surface of housing 12 are again filled with a coupling liquid 16 which transmits the acoustic vibrations from transducer 13 to duct 15 and thence to process liquid 14.

FIGS. 6, 7, 8, and 9 depict embodiments of the invention in which transducer 13 completely envelops process liquid 14. However, similar processing results can be attained if transducer 13 comprises a plurality of discrete transducer elements spaced around the circumference of the process vessel to substantially envelop the process liquid. This notion is illustrated in FIG. 10, which is analogous to FIG. 6, except that the single cylindrical transducer 13 shown in FIG. 6 is replaced with four discrete semi-cylindrical transducer elements 18.

Figure 10:
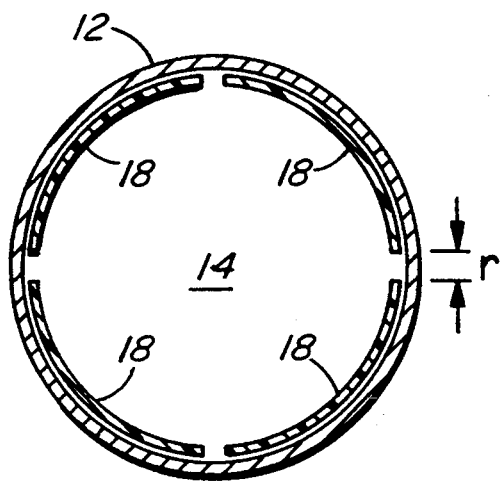
FIG. 10 is similar to FIG. 6, but shows a transducer having four discrete sections.

The FIG. 10 embodiment may be used to improve the manufacturability of the device. The spacing "r" between individual transducer elements 18 should be kept as small as possible, as the reduction in overall transducer area will cause a corresponding reduction in the maximum acoustic power which can be generated by the device. All of the transducer elements 18 should be operated in phase with one another.

Figure 11:
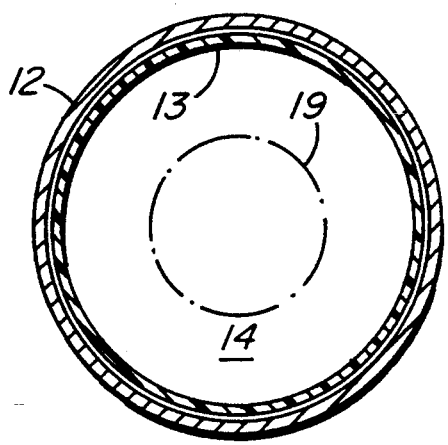
FIG. 11 is similar to FIG. 6, but shows a select volume of process liquid undergoing cavitation.

The cylindrical geometry of the embodiments described above and illustrated in FIGS. 6, 7, 8 and 9 focuses the transducer's acoustic energy towards the longitudinal axis of the cylindrical process vessel. This is particularly useful where it is desired to produce cavitation in the process liquid, because the focused acoustic energy facilitates confinement of the cavitation region to a select volume or "cavitation zone" 19 (FIG. 11) away from the surface of transducer 13 by appropriate selection of the transducer drive voltage V. By preventing cavitation from occurring near the surface of transducer 13 one may reduce problems such as acoustic decoupling of the process liquid from the transducer; and, cavitational erosion of the transducer's surface. Focusing the acoustic energy also reduces the magnitude of the transducer oscillations required to attain a given pressure amplitude within the "cavitation zone" 19.

Figure 12:
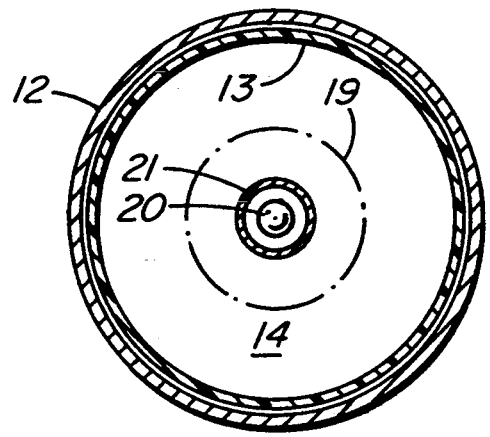
FIG. 12 is similar to FIG. 11, with the addition of an axially aligned fixture for radiating electromagnetic energy into the region of cavitation.

By focusing the acoustic energy in a selected volume of the process liquid one may also more efficiently combine acoustical energy treatment with other treatments. For example, FIG. 12 illustrates how an electromagnetic energy radiating device 20 such as an ultra-violet lamp mounted within a suitable housing 21 (i.e. a quartz tube) can be placed in cavitation zone 19 for simultaneous cavitation and irradiation of the process liquid in cavitation zone 19. For example, such an embodiment may be applied in the treatment of chlorinated organic compounds as described in U.S. Pat. No. 5,130,031 Johnston. Similarly, a fixed solid catalyst or reagent may be mounted along the longitudinal axis of the cylindrical process vessel for more efficient use of the acoustic energy (i.e. due to the observed tendency of acoustic energy to,concentrate in regions occupied by such catalysts or reagents).

It has been noted in U.S. Pat. No. 5,164,094 Stuckart that a piezoelectric polymer such as PVDF may be suitable for use as a transducer in an acoustic separation apparatus. The use of PVDF solves the aforementioned problems inherent to piezoelectric ceramics because PVDF is a relatively flexible and durable planar material. However, it is hindered in its use in this application because of its relatively low acoustic output.

Figure 13:
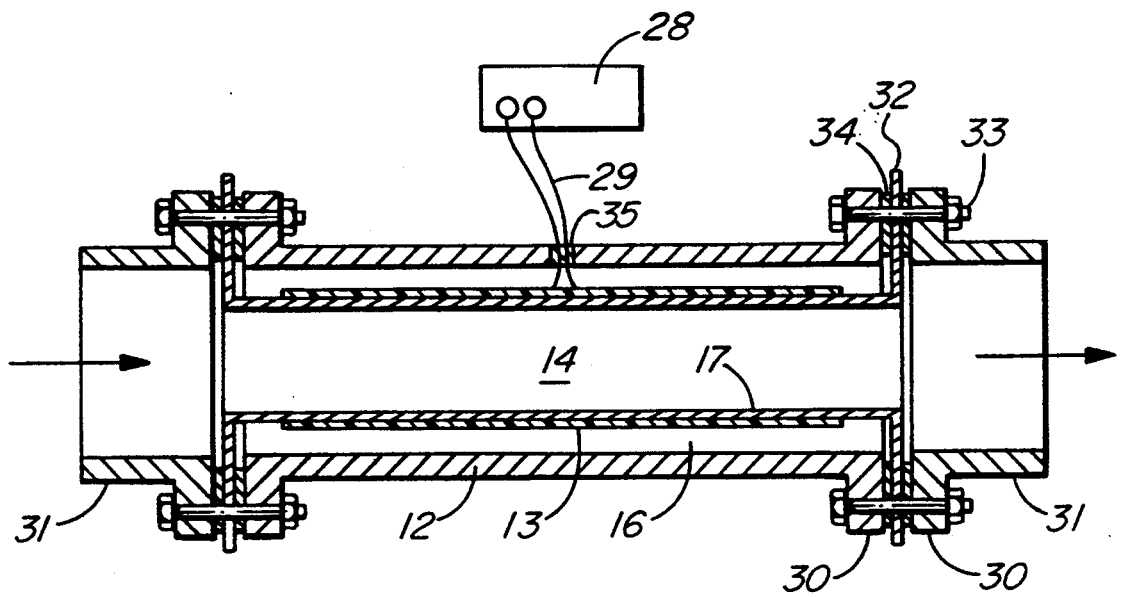
FIG. 13 is a cross-sectional view along the longitudinal axis of an exemplary implementation of a liquid processing device utilizing the FIG. 8 transducer arrangement.

FIG. 13 shows how the transducer arrangement described above in relation to FIG. 8 may be implemented in a process liquid system. Structural housing 12 is equipped with flanges 30 at either end for connection to external piping system 31 which conveys process liquid 14. Inner, acoustically transparent support wall 17 is also equipped with flanges 32 at each end. Inner wall 17 is held rigidly in concentric alignment with housing 12 by compressing flange 32 between flanges 30 via bolted joint 33. Gaskets 34 prevent leakage of coupling liquid and/or process liquid 14 to the external environment. Transducer 13 mounted On inner wall 17 is supplied with electrical energy from energizing means 28 via cables 29 which penetrate the sealed system through grommetted port 35 in housing 12. Elastic deformation of inner wall 17 allows for pressure equalization between coupling liquid 16 and process liquid 14.

Figure 14:
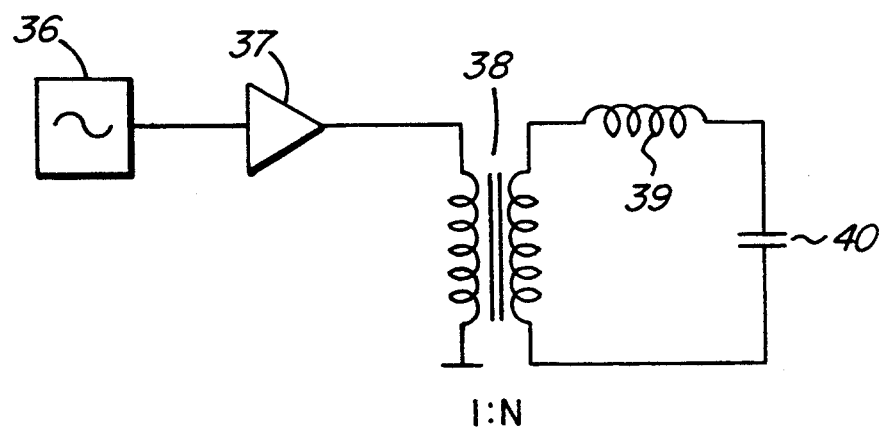
FIG. 14 is a simplified electronic schematic diagram of one possible means for energizing transducers constructed in accordance with the invention.

FIG. 14 shows schematically one example of a means for energizing the transducer. Signal source 36 outputs a sinusoidal signal at the desired frequency(s) which is then amplified by amplifier 37. The low-voltage output from amplifier 37 is fed to the primary side of transformer 38 which raises the voltage of the signal by an amount proportional to the transformer's turns ratio. The resultant high-voltage signal is then fed from the secondary side of the transformer to tuning inductor 39 which has a characteristic inductance "L", and thence to transducer 40 which has a characteristic capacitance "C". Tuning inductor 39 and transducer (capacitor) 40 together form a resonant circuit which operates in electrical resonance at the desired circular frequency "ω" (rad/s) in accordance with the relation: $L = 1/(\omega^2 C)$. Voltage "V" across the transducer 13 is the same voltage "V" as shown in FIG. 1.

In some applications it may be desirable to pressurize the process liquid. One reason for doing this is to increase the cavitation threshold, and thereby allow the use of higher acoustic pressures without causing cavitation (i.e. for use in applications such as acoustic agglomeration where high acoustic pressures are desirable, but cavitation is detrimental). Another reason for doing this is to increase the intensity of the cavitation bubble collapse (which generally increases the effectiveness of the cavitation processing action). If the process liquid is pressurized in any embodiment which employs a coupling liquid (i.e. any of the FIG. 7–12 or 14–16 embodiments), then it will be necessary to equalize the pressure between the process and coupling liquids. The pressure equalizing means could be as simple as a providing an elastic membrane between the coupling liquid and the process liquid. In some cases, the wall separating the coupling and process liquids could itself constitute such a membrane, if mounted correctly.

It will in most cases be desirable to excite one or more resonant modes of the acoustic system. The creation of standing waves is necessary in certain applications of the invention (i.e. acoustic agglomeration) and in general allows the development of much higher acoustic pressures in the process liquid than those directly produced by the transducer. The degree to which the pressure is amplified at resonance depends on the quality factor "Q" of the resonant system, which in turn depends upon the total damping in the system. In order to obtain the highest Q possible in the resonant system it is desirable to keep the internal damping of the transducer as low as possible.

Figure 15:
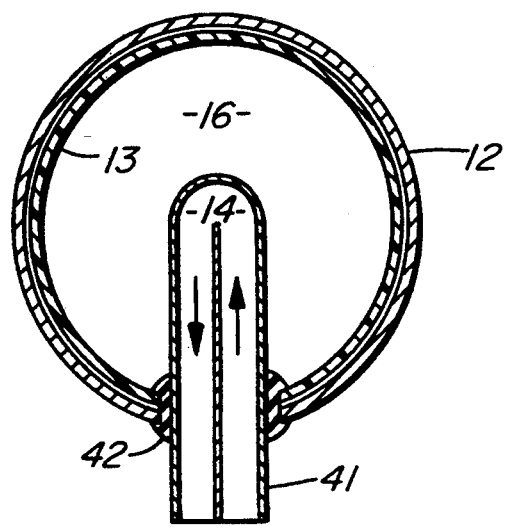
FIGS. 15 and 16 respectively depict alternative spherical and elliptical embodiments of the invention in cross-section.
Figure 16:
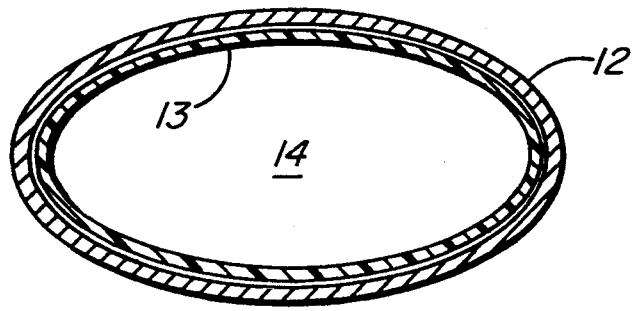

As will be apparent to those skilled in the art in the light of the foregoing disclosure, many alterations and modifications are possible in the practice of this invention without departing from the spirit or scope thereof. For example, in applications requiring very high acoustic intensities, it may be desirable to construct a process vessel which spherically envelops the process liquid to further enhance the focusing of the acoustic energy. FIG. 15 depicts a spherical embodiment of the invention in cross-section. Spherical process vessel housing 12 provides structural support for transducer 13 and encloses process liquid 14. Process liquid 14 is circulated through the focal region of vessel 12 via duct 41 which penetrates vessel 12 through grommetted port 42. The region between the outer surface of duct 41 and transducer 13 is filled with a coupling liquid 16 which transmits the acoustic vibrations from transducer 13 to duct 41 and thence to process liquid 14. In other applications it may be desirable to construct a process vessel which elliptically envelops the process liquid. FIG. 16 depicts an elliptical embodiment of the invention in cross-section. Elliptical process vessel housing 12 provides structural support for transducer 13 and encloses process liquid 14. The scope of the invention is to be construed in accordance with the substance defined by the following claims.

What is claimed is:

1. An acoustic liquid processing device comprising:
    (a) a vessel having an interior wall for surrounding a process liquid having an acoustic impedance;
    (b) an electrostatic film transducer attached to said interior wall to substantially envelop a selected volume of said process liquid, said transducer having an acoustic impedance approximately equal to said process liquid acoustic impedance; and,
    (c) energizing means for energizing said transducer to subject said process liquid to acoustic vibration.

2. An acoustic liquid processing device as defined in claim 1, wherein said vessel is cylindrical.

3. An acoustic liquid processing device as defined in claim 2, wherein said vessel comprises a single cylinder.

4. An acoustic liquid processing device as defined in claim 2, wherein:
    (a) said vessel comprises concentric inner and outer cylinders separated by an annular region containing a coupling liquid;
    (b) said inner cylinder has an acoustic impedance approximately equal to said process liquid acoustic impedance; and,
    (c) said interior wall comprises said inner cylinder's outer surface.

5. An acoustic liquid processing device as defined in claim 2 or 4, wherein said transducer further comprises a multi-layer structure.

6. An acoustic liquid processing device as defined in claim 2 or 4, wherein said transducer further comprises:
    (a) opposed first and second plates electrically coupled to said energizing means for application of an electrical potential between said plates; and,
    (b) a compliant dielectric material disposed between said plates and in contact therewith;
    said dielectric material having a plurality of pockets of approximately average depth "d" such that, for a gas existing within said pockets at a pressure "P", the product Pd is less than one-half the value required to achieve the minimum breakdown voltage of said gas.

7. An acoustic liquid processing device as defined in claim 2 or 4, wherein said transducer further comprises:
    (a) opposed first and second plates electrically coupled to said energizing means for application of an electrical potential between said plates; and,
    (b) a compliant dielectric material disposed between sad plates and in contact therewith for separating said plates by a distance "d" and for allowing a gas to exist between said plates at a pressure "P", wherein the product Pd is less than one-half the value required to achieve the minimum breakdown voltage of said gas.

8. An acoustic liquid processing device as defined in claim 2 or 4, further comprising:
    (a) a duct positioned within said interior wall to confine said process liquid to a selected volume; and,
    (b) a coupling liquid between said duct and said interior wall.

9. An acoustic liquid processing device as defined in claim 8, wherein said coupling liquid has a cavitation threshold exceeding said process liquid's cavitation threshold.

10. An acoustic liquid processing device as defined in claim 2 or 4, wherein said acoustic vibration is of an intensity sufficient to produce cavitation within said process liquid at points removed from said interior wall.

11. An acoustic liquid processing device as defined in claim 1, wherein said acoustic vibration is a resonant mode of said process liquid in said vessel.

12. An acoustic liquid processing device as defined in claim 2, further comprising an ultraviolet light source axially aligned within said interior wall.

13. An acoustic liquid processing device as defined in claim 2, further comprising a solid catalyst axially aligned within said interior wall.

* * * * *